United States Patent
Forschmiedt et al.

(10) Patent No.: US 9,110,732 B1
(45) Date of Patent: Aug. 18, 2015

(54) PROXY FOR INJECTING CONFIGURATION INFORMATION

(71) Applicant: Amazon Technologies, Inc., Reno, NV (US)

(72) Inventors: Kent David Forschmiedt, Shoreline, WA (US); George Oliver Jenkins, Redmond, WA (US); Deepak Suryanarayanan, Seattle, WA (US); David Everard Brown, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 263 days.

(21) Appl. No.: 13/912,984

(22) Filed: Jun. 7, 2013

(51) Int. Cl.
*G06F 9/50* (2006.01)
*G06F 9/445* (2006.01)
*G06F 9/455* (2006.01)
*G06F 9/44* (2006.01)

(52) U.S. Cl.
CPC ............... *G06F 9/5077* (2013.01); *G06F 8/61* (2013.01); *G06F 8/63* (2013.01); *G06F 9/5005* (2013.01); *G06F 8/71* (2013.01); *G06F 9/44505* (2013.01); *G06F 9/455* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 7,577,722 B1 * | 8/2009 | Khandekar et al. | 709/220 |
| 8,930,957 B2 * | 1/2015 | Assuncao et al. | 718/104 |
| 2010/0313200 A1 * | 12/2010 | Rozee et al. | 718/1 |

* cited by examiner

*Primary Examiner* — Qing Wu
(74) *Attorney, Agent, or Firm* — Hogan Lovells US LLP

(57) ABSTRACT

A proxy operating inside of a virtual machine that is responsible for receiving user-specified configuration information, such as credentials, and updating the configuration of the virtual machine with the user-specified values at the time of assigning the virtual machine to a user. Once the proxy updates the configuration of the virtual machine, the virtual machine is assigned the user that provided the user configuration information and the proxy can deactivate or uninstall itself from the virtual machine, such as by deleting all files, registry entries and other traces of execution.

20 Claims, 11 Drawing Sheets

PROXY FOR INJECTING CONFIGURATION INFORMATION

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

In this context, many cloud computing providers utilize virtualization to allow multiple users to share the underlying hardware and/or software resources. Virtualization can allow computing servers, storage device or other resources to be partitioned into multiple isolated instances (i.e. virtual machines) that are associated with (e.g., owned by) a particular user (e.g., customer). Each virtual machine conventionally includes its own operating system that is capable of executing one or more applications on behalf of the user. Virtualization can thus enable various users to run their applications remotely, using on the resources of the cloud computing provider. However, providing a conventional virtual computing environment has a number of limitations. For example, the process of provisioning a new virtual machine for a user may take a significant amount of time, due to the customization and other tasks involved. In mission critical environments, where users may wish to create new virtual machines within minutes or even seconds, the conventional provisioning processes may be inconvenient and/or inefficient.

BRIEF DESCRIPTION OF THE DRAWINGS

Various embodiments in accordance with the present disclosure will be described with reference to the drawings, in which.

DETAILED DESCRIPTION

Figure 1:
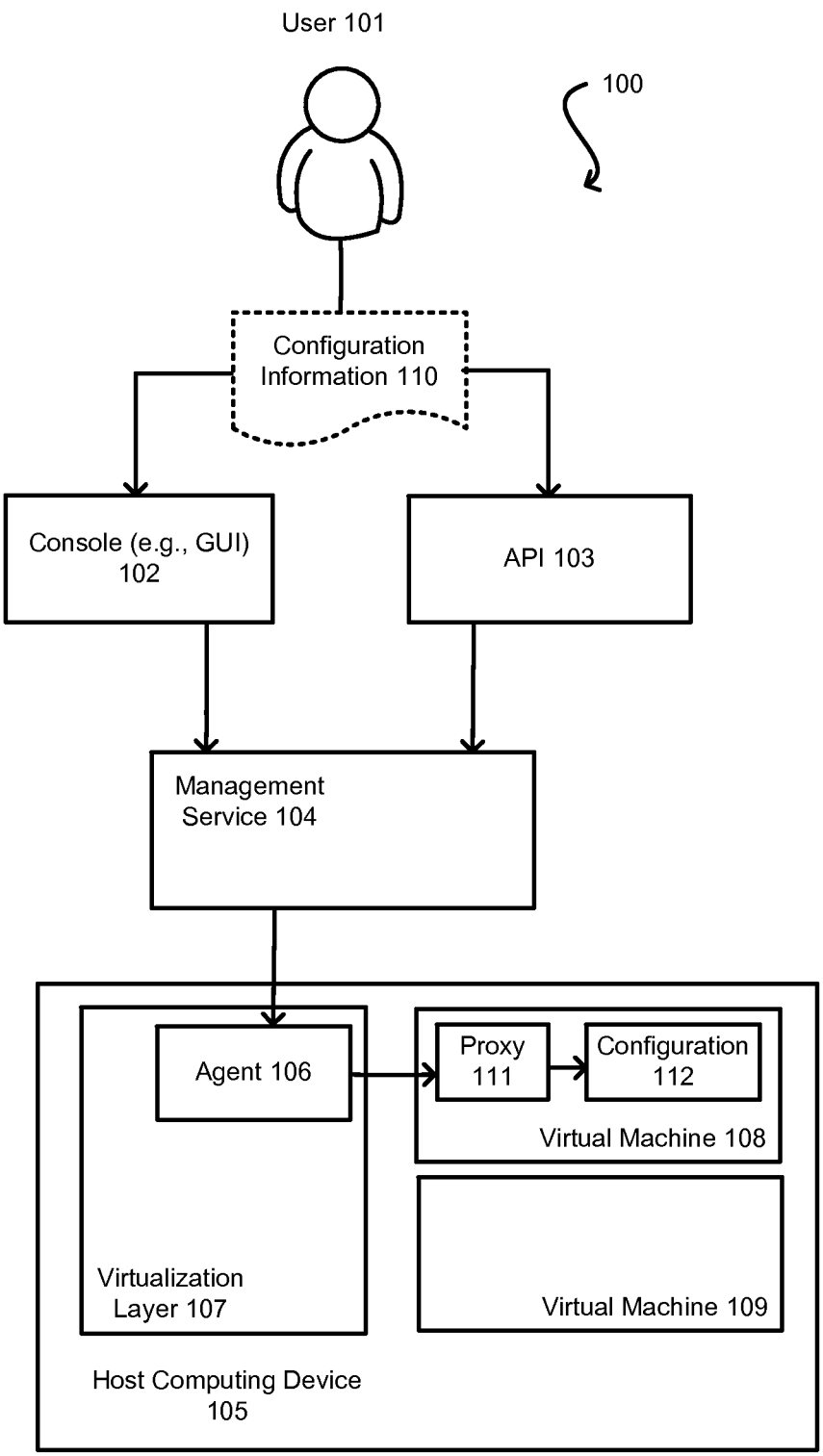
FIG. 1 illustrates an example of a user specifying configuration information to be injected into a virtual machine, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for managing and configuring components, such as virtual machines and/or operating systems, in a computing environment. In particular, various embodiments provide a proxy (e.g., software agent) operating inside of a virtual machine, where the proxy is responsible for receiving user-specified configuration information, such as credentials, and updating the configuration of the virtual machine with the user-specified values at the time of assigning the virtual machine to a user. Once the proxy updates the configuration of the virtual machine, the virtual machine is assigned the user that provided the user configuration information and the proxy can deactivate or uninstall itself from the virtual machine, such as by deleting all files, registry entries and other traces of execution.

Conventionally, certain types of operating systems, such as Microsoft Windows™, require a user to specify various configuration information at the time of installing (e.g., setting up) the operating system on a computing device (or on a virtual machine). For example, the user may need to provide the user name and password (or other credentials), the time of day, geographic location, language, and other user customization/personalization information. In some cases, pieces of such configuration information may need to be provided throughout the various steps of the installation process, requiring the user to manually configure the operating system. This lengthy process may be frustrating for users, especially in the context of a virtualized computing environment, where a user may be trying to quickly start up a new virtual machine to perform one or more tasks on behalf of the user.

In accordance with various embodiments, to address such lengthy set up processes, a pool of pre-staged virtual machines can be provisioned by a service provider or other operator of a virtualized computing environment. Each pre-staged virtual machine may include an operating system installed thereon, where the operating system is preconfigured using a set of default (e.g., administrative) configuration data. In addition, a pre-staged virtual machine includes a proxy residing thereon, where the proxy is capable of receiving user-specified configuration information and replacing the default configuration data of the virtual machine with the user-specified configuration information.

When a user requests a virtual machine to be provisioned, the user may specify to the service provider (or other operator) a set of configuration information to be used with the virtual machine. The configuration information may include a user name/password, service account information, cryptographic keys, digital identity certificates, personalization information (e.g., language, desktop layout, geographic location, etc.) and the like. The user may provide the configuration information by using an application programming interface (API), command line interface, an application running on a mobile client device or an interactive web-based console to specify the information to a management service running in the computing environment.

Once the management service receives the request to provision a new virtual machine and the configuration information to be used with the virtual machine, the management service may select a pre-staged virtual machine from the pool of pre-staged virtual machines and inject the user-specified configuration information into the virtual machine by using the proxy operating inside the pre-staged virtual machine. For example, the management service may provide the user-specified configuration information to a host computing device that is hosting the pre-staged virtual machine and the host computing device may invoke the proxy to update the virtual machine with the user-specified configuration information. Once the proxy updates the virtual machine with the user-specified configuration, the virtual machine can be assigned to the user and the proxy may deactivate and delete itself from the virtual machine.

As described above, the process of injecting the user-specified configuration information into a virtual machine can be utilized within the context of a virtualized computing environment, such as a multitenant public or private cloud. In this type of environment, an operator of the virtualized computing environment (e.g., service provider) may provide access to physical resources, such as host computing devices, to its users (e.g., customers) and allow the users to execute their programs using the physical resources of the service provider. For example, each host computing device can include a virtualization layer (e.g., a hypervisor in combination with a privileged domain) that hosts one or more guest virtual machines. Each virtual machine can be owned by a particular user and can execute a service or application using the physical resources (i.e., host computing device) of the virtualized computing environment. The user can request, access and manage their resources via APIs and other management tools.

FIG. 1 illustrates an example 100 of a user specifying configuration information to be injected into a virtual machine, in accordance with various embodiments. As shown in the illustration, the user 101 may request a virtual machine and provide the configuration information 110 to be used with the virtual machine. For example, as part of requesting the virtual machine, the user may specify the credentials to be used by the virtual machine, the name of the virtual machine, the default domain of the virtual machine and other configuration information. To specify the information, the user may utilize an application programming interface (API) 103, an interactive web-based console 102 that includes a graphical user interface (GUI), a command line interface, an interface displayed by an application on a client mobile device, or any other interface. In one embodiment, the user specifies the information over a network, such as the Internet.

The configuration information 110 may be provided to a distributed management service 104 operating in the virtualized computing environment. The management service 104 can be any service, application or other component that is configured to receive requests from users and to invoke the appropriate processes to provision the virtual machine for the user. In the illustrated embodiment, the management service 104 receives the user-specified configuration information 110, selects a virtual machine for the user and provides the information to the host computing device 105 hosting the selected virtual machine 108. In some embodiments, the virtual machine 108 is selected from a pool of preconfigured virtual machines, as will be described in further detail later in this specification, with reference to FIG. 3. In other embodiments, any other virtual machine may be selected by the management service 104, such as a virtual machine that has been installed with an operating system and includes a proxy 111 operable to update the configuration of the virtual machine.

The host computing device 105 may include a virtualization layer 107, such as a virtual machine manager or a hypervisor with a host domain that manages one or more virtual machines, such as virtual machine 108 and 109. In the virtualization layer, the host computing device includes an agent 106 that receives the user-specified configuration information 110 from the management service 104 and causes the configuration information to be provided to the proxy 111 inside the virtual machine 108. For example, the proxy 111 may open a socket and listen for the agent 106 in the virtualization layer 107 to write to the configuration information 110 to the proxy 111.

In various embodiments, the proxy 111 can be implemented as a software agent, configuration utility, server application, or other program that resides in the domain of the virtual machine and is capable of internally updating the configuration of the virtual machine and the operating system thereon. When the proxy 111 receives the user-specified configuration information 110, the proxy updates the configuration 112 of the virtual machine 108 using the received configuration information 110. In one embodiment, when installed, the proxy 111 operates under a set of administrative credentials and once the proxy receives the user-specified credentials, the proxy replaces the administrative credentials with the credentials of the user. Once the credentials have been replaced, the virtual machine 108 becomes accessible by the user 101 using their own password. Similarly, the proxy may also update various other configuration settings of the virtual machine with the settings provided by the user 101, such as language settings, default domain name, service account information, cryptographic keys, digital identity certificates, time zone information, language information, or other user personalization information.

Once the proxy 111 has finished updating the configuration 112 of the virtual machine 108 with the user-specified configuration information 110, the proxy 111 can deactivate itself. For example, the proxy 111 can be uninstalled from the virtual machine 108 by deleting all files and registry entries associated with the proxy 111. This is performed in order to prevent exposure of sensitive information to potentially malicious users. Since the proxy 111 may serve as an intentional backdoor to update configuration information of the virtual machine, it can be important to remove the backdoor to prevent malicious users from gaining control of the proxy and utilizing it to modify the credentials and other configuration of the virtual machine. The proxy 111 is therefore sequenced to shut down and not to be restarted again after it has finished updating the configuration 112.

Once the proxy has deleted itself, the virtual machine 108 may be assigned to the user 101. In some embodiments, the virtual machine 108 can be added to the virtual network of the user 101 by assigning the appropriate internet protocol (IP) address to the virtual machine 108. The ability to assign the virtual machine to a virtual network will be described in further detail in later portions of this disclosure, with reference to FIGS. 3 and 6. Once the virtual machine has been assigned to the user, the user may remotely access the virtual machine 108 over the network (e.g., Internet) using various tools, such as APIs. The virtual machine 108 and the operating system can be used to run one or more applications or services on behalf of the user 101.

Figure 2:
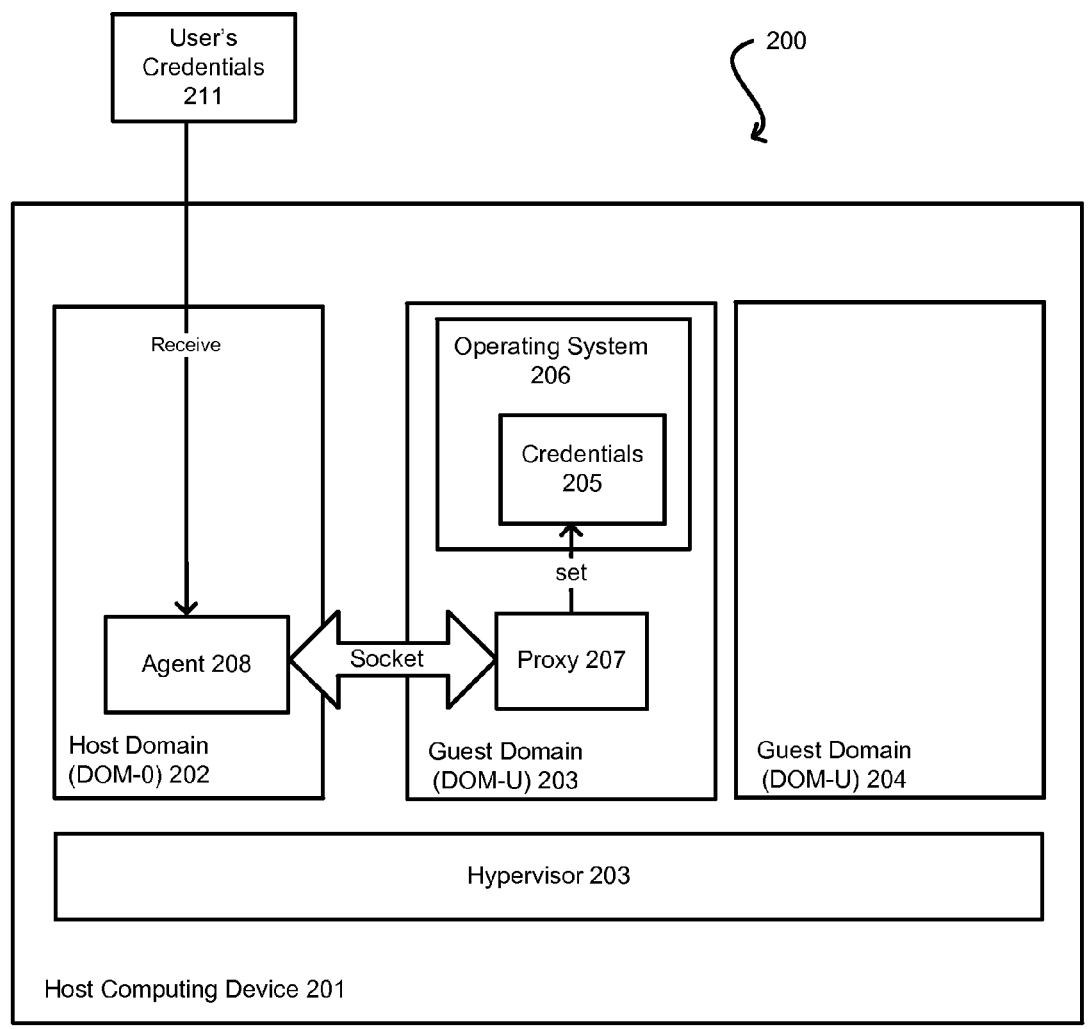
FIG. 2 illustrates an example of a host computing device hosting a virtual machine into which a user's credentials are injected using a proxy, in accordance with various embodiments.

FIG. 2 illustrates an example 200 of a host computing device hosting a virtual machine into which a user's credentials are injected using a proxy, in accordance with various embodiments. As shown in the illustration, the virtualization layer on the host computing device 201 may be implemented as a combination of a hypervisor 203 and a host domain (e.g., Domain 0) 202 that together manage one or more guest domains, such as guest domains 203 and 204. The hypervisor runs in a higher privileged mode than the other domains and manages access to the hardware by all other domains. The host domain 202 includes an administrative operating system for configuring the operation and functionality of the various guest domains of lower privilege, such as the domains of the guest domains 203 and 204. Each guest domain may correspond to a virtual machine that may be assigned to a user. The functionality of a hypervisor and host domain will be described in further detail later in this disclosure, with reference to FIG. 4.

As illustrated in FIG. 2, the host computing device 201 includes an agent 208 that resides in the host domain 202 and is operable to receive the user-specified configuration information, such as user's credentials 211. The credentials 211 may include a username and password combination and the credentials may be received from an external entity, such as a management service operating on a different host computing device, or the like. In the illustrated embodiment, the agent 208 interacts with the proxy 207 residing in the virtual machine domain 203 to provide the user's credentials 211 to the proxy 207. For example, the proxy 207 may open a socket to the agent 208 in DOM-0 202 and listen for the agent 208 in the DOM-0 to write to it. Alternatively, the agent 208 may be listening while the proxy in the guest domain 203 may be periodically polling the agent 208 to discover if any configuration information has been provided. Once the agent 208 receives the user's credentials 211, it copies the credentials 211 to the proxy 207, which updates the credentials 205 of the operating system 206 with the received user's credentials 211. For example, while the virtual machine has not yet been assigned to a user, the proxy 207 may be running under the administrative credentials and once the proxy receives the user's credentials, it replaces the administrative credentials with the user's credentials. Once the credentials have been updated, the virtual machine becomes accessible by the user.

In various embodiments, once the credentials have been updated by the proxy 207, a number of cleanup tasks may be performed to remove the mechanism of updating the configuration of the virtual machine. The proxy 207 may be deactivated by deleting all files and registry entries, as previously described. In addition, the agent 208 may delete any copies of the user's credentials present on the host device 201 so as not to retain copies of the user's credentials 211 on the host computing device 201. Because the user's credentials 211 are very sensitive information, it may be desirable to delete the credentials from the host domain 202 and other locations (e.g., management service, etc.).

Figure 3:
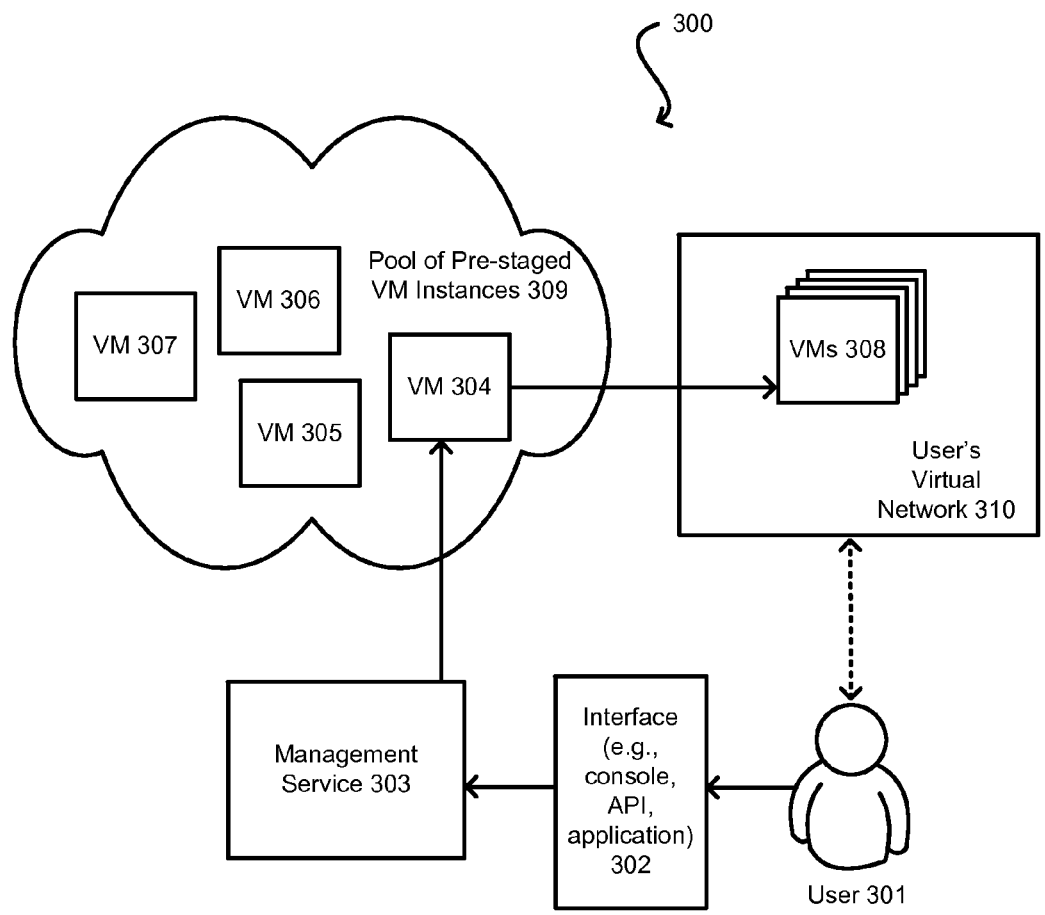
FIG. 3 illustrates an example of assigning a virtual machine to a user from a pool of pre-staged virtual machines, in accordance with various embodiments.

FIG. 3 illustrates an example 300 of assigning a virtual machine to a user from a pool of pre-staged virtual machines, in accordance with various embodiments. As shown in the illustration, an operator of the virtualized environment may maintain a pool 309 of pre-staged virtual machine (VM) instances (304, 305, 306, 307) that have been installed with basic operating system components and are waiting to be assigned to a user. In one embodiment, each pre-staged instance has been provisioned with an operating system, however, the pre-staged VM is in an incomplete state because it has not been configured with user-specific configuration information. The pool of pre-staged instances 309 may be a secure container that holds ownership of the virtual machines until the virtual machine is assigned to a user.

In the illustrated embodiment, the user 301 may use an interface 302 (e.g., API, console, application on a mobile device, etc.) to submit a request to a management service 303, requesting that a new virtual machine be provisioned for the user 301. For example, the user 301 may have a virtual network 310 provisioned for the user and the user may wish to add a new virtual machine to the virtual network. A virtual network 310 may be comprised of a plurality of virtual machines 308 and other components (e.g., virtual routers, etc.) that communicate with one another and otherwise simulate an actual network of physical machines. Each virtual machine in the virtual network 310 may be assigned a virtual IP address and the virtual network may have a network name and other domain characteristics.

When the user 301 submits the request to the management service 303, the user may also provide the user-specified configuration information to the management service 303. The management service 303 may then select a virtual machine 304 to be assigned to the user and transmit the configuration information to the host computing device hosting the selected virtual machine 304. An agent operating in the host computing device may then transfer the configuration information to the proxy operating inside the virtual machine 304, which may update the configuration information of the virtual machine 304, as previously described. The virtual machine may then be assigned to the user. In the illustrated embodiment, the virtual machine may also be added to the user's virtual network 310. The proxy operating inside the virtual machine may be used to update the operating system configuration of the virtual machine for the virtual network.

Figure 4:
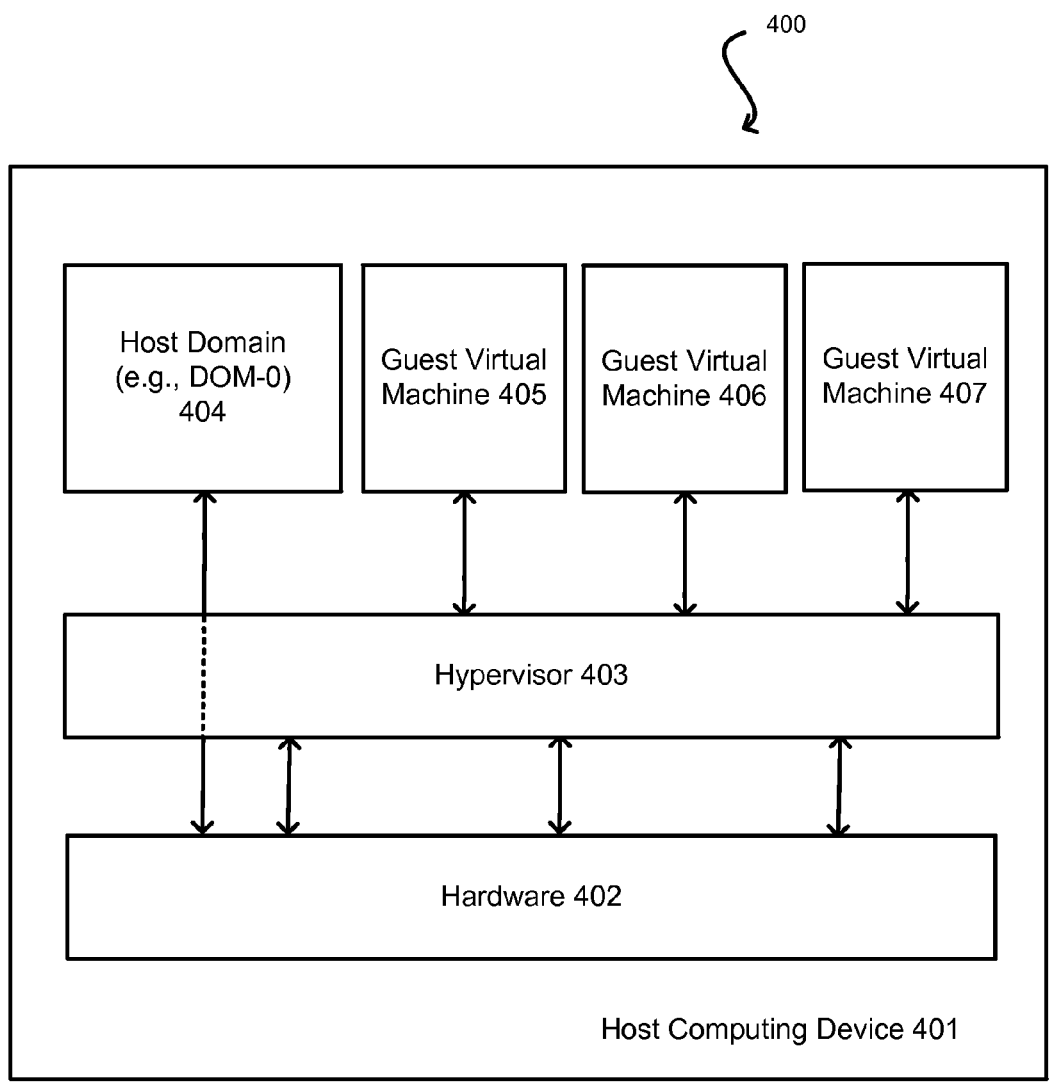
FIG. 4 illustrates an example of utilizing one virtualization technique on a host computing device by using a hypervisor, in accordance with various embodiments.

As previously mentioned, the virtual machine may be operating on a host computing device that resides in a resource center of a service provider or other operator of the virtualized computing environment. On the host computing device, a number of virtualization techniques can be used to simultaneously operate a plurality of guest virtual machines or guest operating systems. FIG. 4 illustrates an example 400 of utilizing one virtualization technique using a hypervisor, in accordance with various embodiments. The hardware 402 of the host computing device 401 interfaces with a hypervisor 403 running directly on the hardware 402 (e.g., a "bare metal" or native hypervisor). Examples of such hypervisors include Xen, Hyper-V®, and the like. Hypervisors typically run at a higher, more privileged processor state than any other software on the machine, and provide services such as memory management and processor scheduling for dependent layers and/or domains. The most privileged of such layers and/or domains resides in the service domain layer, which may include a host domain 404 that may include an administrative operating system for configuring the operation and functionality of the hypervisor 403, as well as that of domains of lower privilege, such as the domains of the guest virtual machines (405, 406, 407) or other operating systems, which may be heterogeneous (e.g., running different operating systems than each other). The host domain 404 (e.g., DOM-0) may have direct access to the hardware resources 402 of the host computing device 401 by way of the hypervisor 403, while the guest virtual machine domains (405, 406, 407) may not.

Figure 5:
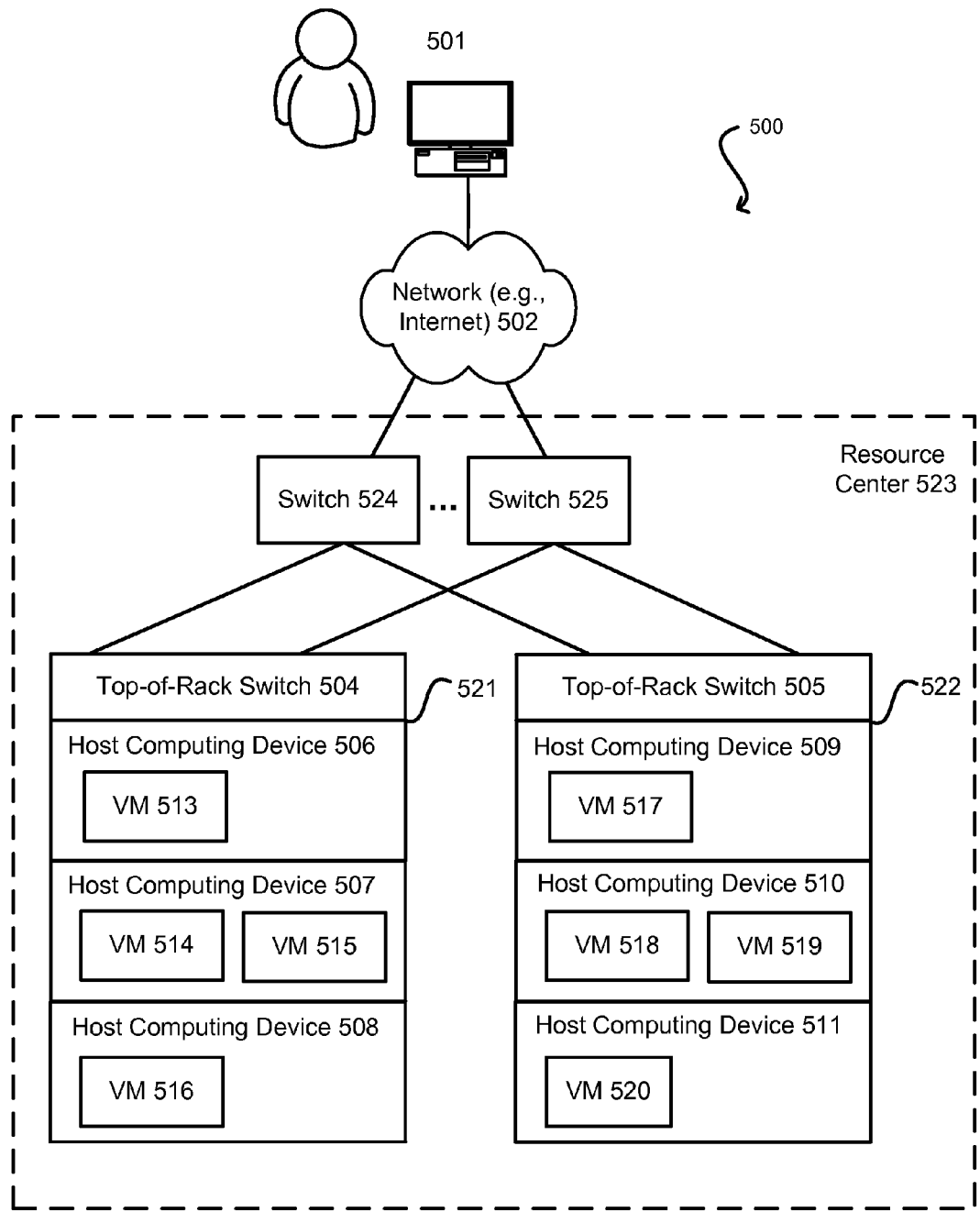
FIG. 5 illustrates an example of a resource center of a service provider that provides the physical resources that can be used to enable a virtualized computing environment, in accordance with various embodiments.

FIG. 5 illustrates an example 500 of a resource center of a service provider that provides the physical resources that can be used to enable a virtualized computing environment, in accordance with various embodiments. In the illustrated embodiment, a service provider (or other operator of the virtualized computing environment) can maintain one or more resource centers 523 (e.g., data centers, server farms, etc.) that store the physical resources (e.g., host computing devices, etc.) of the service provider. The resource centers may be located in different geographic locations to provide improved redundancy and failover, as well as more localized access to resources. The physical resources can be used to host a number of virtual machines or virtual servers that can be provided to users 501 over a network 502, such as the Internet. For example, when a user wants to execute an application using the physical resources of the service provider, he or she may request the service provider to provision a virtual machine for the user, which will be used to deploy and execute the application. As demand for the user's application grows, the user can request that more virtual machines be provisioned to balance the load, request creation of one or more virtual networks and the like.

In the illustrated example, the resource center 523 of the service provider may include one or more racks 521, 522 of host computing devices (506, 507, 508, 509, 510) wherein each host computing device on a particular rack is connected to a single top-of-rack (TOR) switch (504, 505). These TOR switches can be further connected to one or more other switches (524, 525) which enable the host computing devices to connect to the network. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with an embodiment, each host computing device can host one or more virtual machine instances (513, 514, 515, 516, 517, 518, 519) that have been provisioned for the customers of the service provider to execute the various applications and services on behalf of those customers. Each virtual machine can be provisioned with its own operating system (OS) including a kernel, drivers, process management and the like.

When a customer wishes to obtain a virtual machine instance, the customer can first submit a request to the service provider, indicating the type of VM they would like to use. The service provider (or other operator) may carry out the processes to provision the virtual machine instance which will be hosted on the physical resources (e.g., host computing devices) of the service provider. When requesting the VM, the user may specify the configuration information to be used with the VM, as previously described. The operator of the virtualized computing environment may then invoke the appropriate services to inject the user-specified configuration information into the virtual machine and to assign the configured virtual machine to the user.

Figure 6:
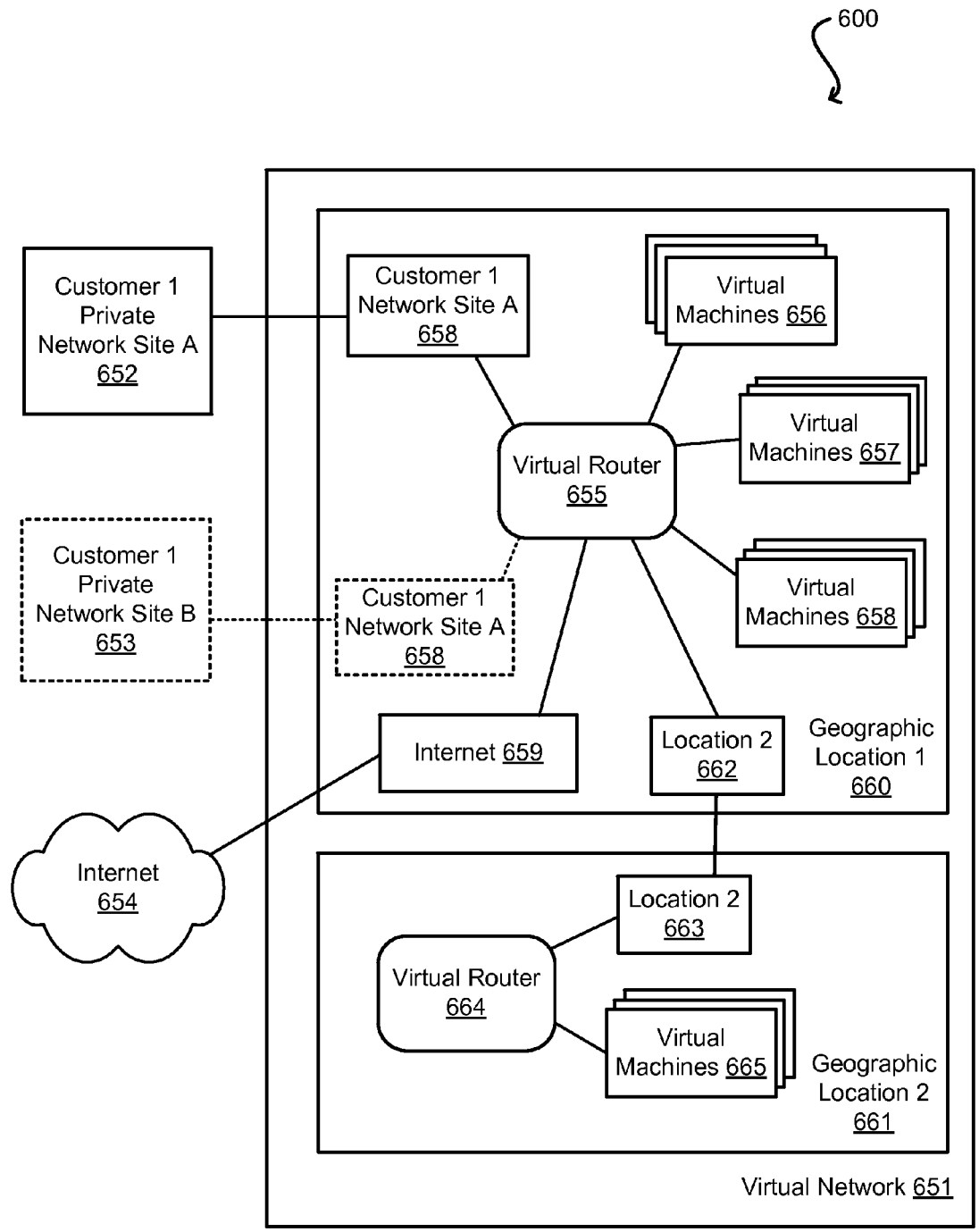
FIG. 6 illustrates an example of a virtual network of multiple virtual machines that can be provided for a user in the virtualized computing environment, in accordance with various embodiments.

As previously described, when the virtual machine is assigned to the user, it may be associated with a virtual network provisioned for that user. FIG. 6 illustrates an example 600 of a virtual network of multiple virtual machines that can be provided for a user in the virtualized computing environment, in accordance with various embodiments. As previously mentioned, the service provider (or other operator of the virtualized computing environment) can provide a resource center that maintains the physical resources (e.g., host computing devices, etc.) to host the various virtual machines and virtual networks, such as virtual network 651, for one or more customers of the service provider. In some embodiments, the service provider may provide a network service that can be used to create and configure the virtual networks by various customers of the service provider.

In the illustrated example, the virtual network 651 is a private network extension to a remote private computer network of a customer. The virtual network 651 includes various virtual machines that are located at a first geographic location 1 660 (e.g., in a first data center located in the geographic location 1). The virtual machines can be configured into logical groups 657, 658, and 659 (e.g., to correspond to different subnets and associated networking devices not shown). In this example, a single conceptual virtual router 655 is shown in geographic location 1 660 to control communications between those virtual machines and other computing systems, so as to illustrate different types of communications that may occur, although in alternative embodiments, there may be multiple or no configured networking devices at geographic location 1. The virtual network may be implemented in geographic location 1 660 in various manners, such as via multiple physical interconnected routers or other networking devices, by using an underlying substrate network and associated modules that control communications over the underlying network, or the like. In this example, the virtual router 655 operates in accordance with the configured information for the virtual network 651, including configured network topology information, such as may be configured by the customer using the network service provided by the service provider.

In this example, the virtual network 651 is provided for example customer 1, and is a network extension to a remote computer network of customer 1. Customer 1's remote computer network includes multiple computing systems (not shown) at a first remote location, such as Private Network Site A 652, and the virtual router 655 is configured to communicate with those multiple computing systems via a virtual communication link 658. For example, the virtual network may include one or more configured virtual private network (VPN) connections to the multiple computing systems at Site A 652, and the communication link 658 may correspond to one or more such VPN connections. In addition, the remote computer network of customer 1 may optionally include computing systems at one or more other locations, such as the illustrated optional Private Network Site B 653, and if so, the virtual router 655 may further be configured to communicate with those other computing systems at the other locations, such as via an optional virtual communication link 658 to Site B 653 (e.g., via one or more other configured VPN connections directly to Site B). When multiple VPN connections or other secure connections are used to remote computing systems of a remote computer network, each connection may correspond to a subset of the remote computing systems (e.g., by being associated with a subset of the network addresses of the remote computer network that correspond to those computing systems) so as to cause communications to be routed to the appropriate connection. In other embodiments, multiple VPN connections or other secure connections may be used to remote computing systems at one or more locations, but may each support communications to any of the remote computing systems, such as if the multiple connections are redundant alternatives (e.g., used for load balancing). Further, in some embodiments, a client's remote computer network may include multiple computing systems at multiple sites, but only a single VPN connection or other secure connection to the remote computing systems may be used, with the remote computer network being responsible for routing the communications to the appropriate site and computing system.

In addition, the virtual network 651 may be configured to allow all, some or no communications between the virtual machines of the virtual network and other external computing systems that are generally accessible on the Internet 654 or other public networks. If at least some such external communications are allowed, the virtual router 655 may further be configured to communicate with those external multiple computing systems via an optional virtual communication link 659.

In the illustrated embodiment, in addition to the virtual machines (656, 657, 658) at geographic location 1 660, the virtual network may further include virtual machines 665 that are located at a second geographic location 2 661 (e.g., at a distinct second resource center at the geographic location 2). Accordingly, the virtual router 655 may be configured to include a virtual communication link 662 to the portion of the virtual network at the geographic location 2 661. In this example, the portion of the virtual network at the geographic location 2 661 similarly is illustrated with a conceptual virtual router 664 to manage communications to and from the virtual machines 665, including to communicate with the portion of the virtual network at the geographic location 1 660 via a virtual communication link 663. Such communications between virtual machines of the virtual network at different geographic locations may be handled in various manners in various embodiments, such as by sending the communications over the Internet or other public networks (e.g., as part of a secure tunnel using encryption) by sending the communications in a private secure manner (e.g., via a dedicated lease line between the geographic locations), etc. In addition, while not illustrated here, the portion of the virtual network at the geographic location 2 may similarly include other virtual communication links, such as to remote client private networks (e.g., via one or more VPN connections distinct from any VPN connections to the geographic location 1), to the Internet, etc.

As previously described, when a virtual machine is assigned to a user (e.g., customer 1), it may be added to the virtual network of that user. The proxy may also be used to update the configuration of the operating system of the virtual machine for the virtual network. For example, the proxy may inject the domain name of the virtual network along with other configuration information in the virtual machine. Once the configuration information is set, the proxy deactivates and the virtual machine is added to the virtual network of the user.

Figure 7:
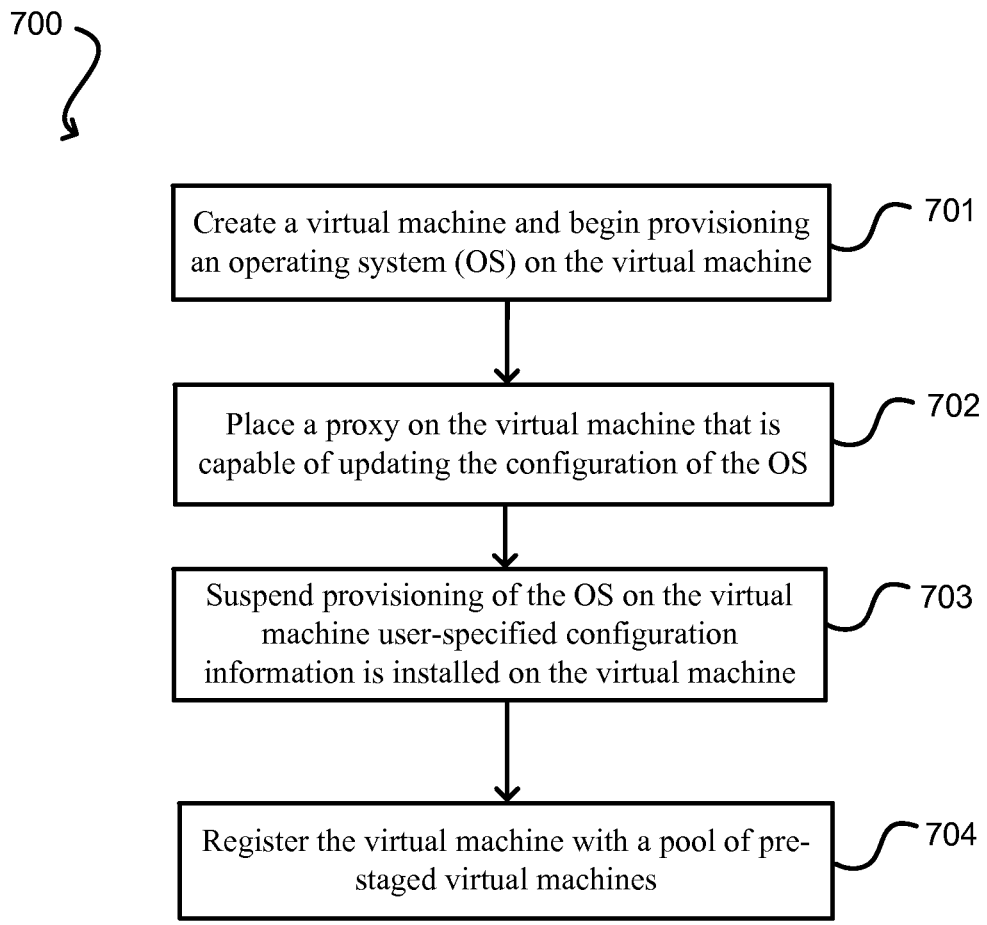
FIG. 7 illustrates an example process for provisioning a virtual machine and registering the virtual machine with a pool of pre-staged instances, in accordance with various embodiments.

FIG. 7 illustrates an example process 700 for provisioning a virtual machine and registering the virtual machine with a pool of pre-staged instances, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 701, the operator of a virtualized computing environment may initiate the provisioning of a virtual machine on a host computing device. For example, the operator may create the virtual machine and begin installation of the operating system on the virtual machine. The installation of the operating system may be performed using default configuration values which will be changed at a later point in time, upon assigning the virtual machine to a user. In operation 702, the operator places (e.g., installs) a proxy on the virtual machine. In some embodiments, the proxy may be written into a machine image of the virtual machine such that the virtual machine may come pre-installed with the proxy before provisioning of the virtual machine for the user. In other embodiments, the proxy may be installed in the virtual machine at the time of provisioning the virtual machine. The proxy is capable of updating the configuration information of the virtual machine, such as a username, a password, service account information, a cryptographic key, a digital certificate, a domain name, time zone information, language information, or user personalization information.

Once at least a portion of the operating system has been installed on the virtual machine, the operator may suspend the provisioning of the virtual machine before the user-specified configuration information is injected into the virtual machine, as shown in operation 703. At this point, the virtual machine is pre-staged and is in an incomplete state because it is not provisioned with the user's credentials and other user-specific information. In operation 704, this pre-staged virtual machine may be registered with a pool of pre-staged virtual machines that are waiting to be assigned to a user.

Figure 8A:
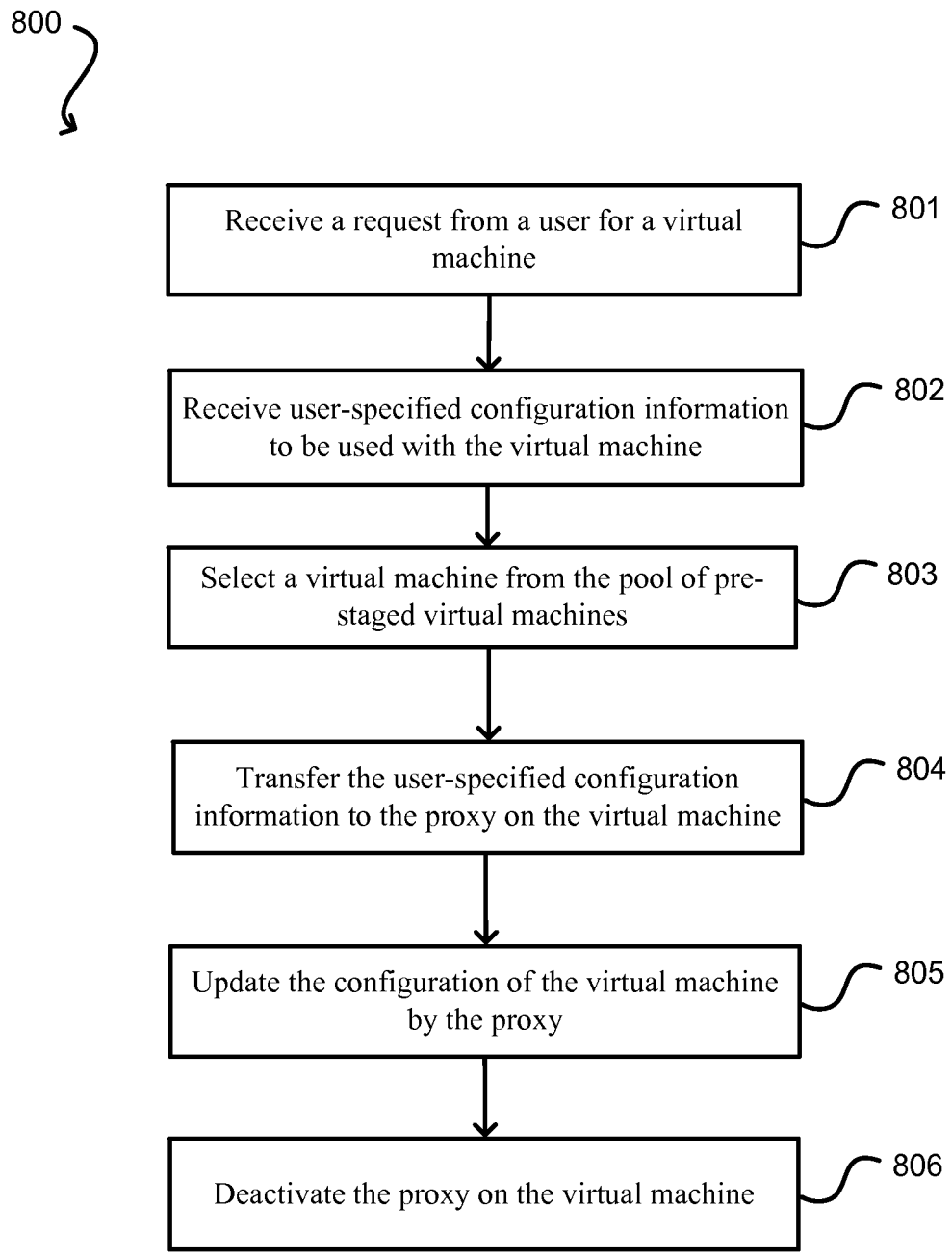
FIG. 8A illustrates an example process of injecting the user-specified configuration information into a pre-staged virtual machine, in accordance with various embodiments.

FIG. 8A illustrates an example process 800 of injecting the user-specified configuration information into a pre-staged virtual machine, in accordance with various embodiments. In operation 801, a request to provision a virtual machine is received from a user. In operation 802, the user-specified information to be used with the virtual machine is also received from the user, such as by way of an API or an interactive web-based console. In some embodiments, the user-specified configuration information is provided at the time of the request. In other embodiments, the information may be specified by the user at a later time, or obtained from another source. The request may be received over a network by a management service operable to provision new virtual machines for the user.

In operation 803, the management service selects a virtual machine from a pool of pre-staged virtual machines. For example, if the user's request specified that the virtual machine be provisioned with a Windows operating system, the management service may select a pre-staged instance with Windows pre-configured thereon. In operation 804, the management transfers the user-specified configuration information to the proxy on the virtual machine. In one embodiment, the management service may provide the information to the host computing device that is hosting the selected virtual machine and the host computing device may cause the information to be transferred into the proxy.

In operation 805, the proxy updates the configuration of the virtual machine with the user-specified configuration information. For example, the proxy may replace the credentials of the virtual machine with the user's credentials, as well as update other configuration information of the virtual machine. In operation 806, once the proxy has completed updating the configuration of the virtual machine, the proxy deactivates itself.

Figure 8B:
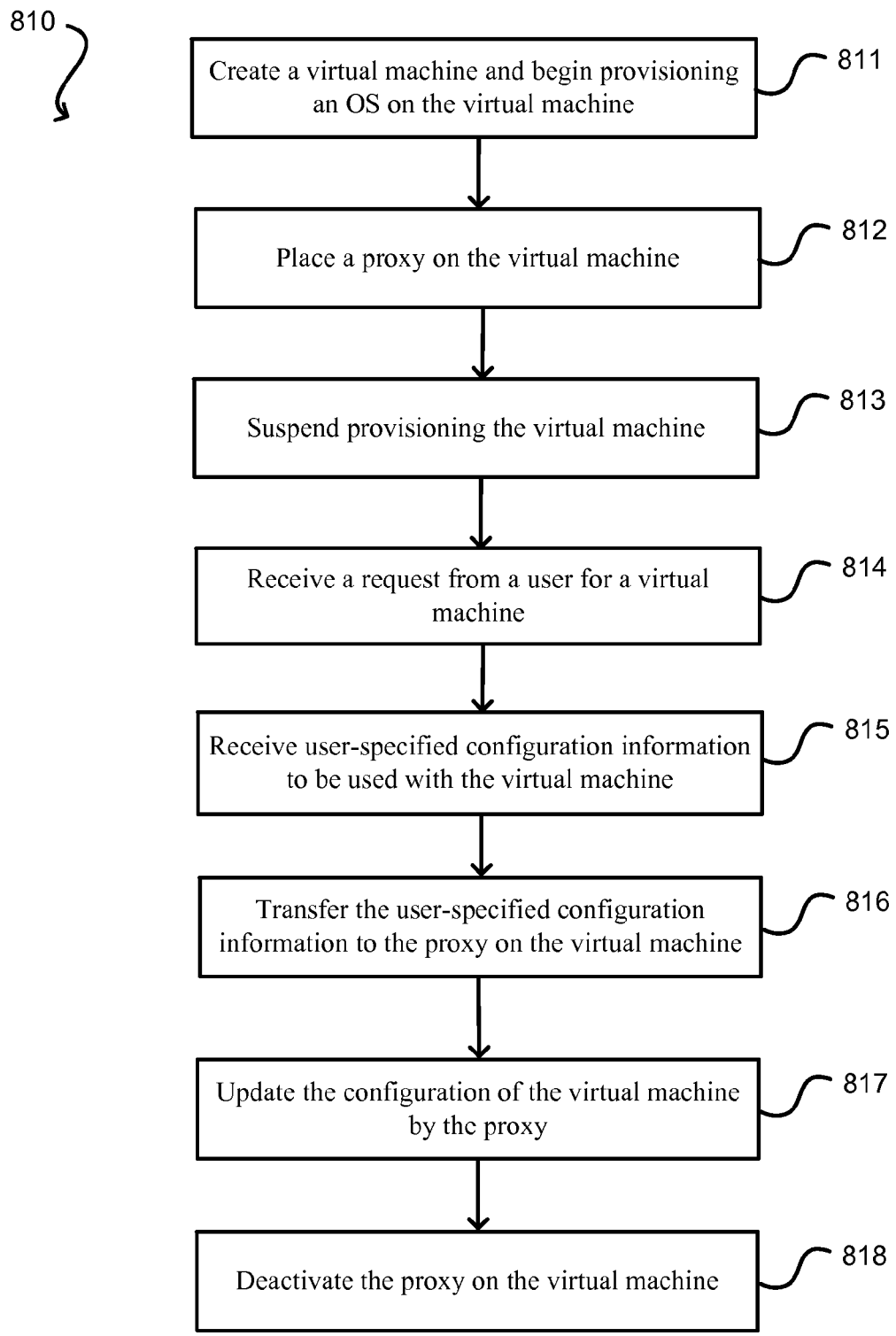
FIG. 8B illustrates an example process of provisioning a virtual machine and injecting user-specified configuration information into the virtual machine without registering the virtual machine with a pool of pre-staged instances, in accordance with various embodiments.

FIG. 8B illustrates an example process 810 of provisioning a virtual machine and injecting user-specified configuration information into the virtual machine without registering the virtual machine with a pool of pre-staged instances, in accordance with various embodiments. In operation 811, a virtual machine is provisioned on a host computing device. For example, an operator of a virtualized environment may create the virtual machine and begin installation of the operating system on the virtual machine. The installation of the operating system may be performed using default configuration values which will be changed at a later point in time, upon assigning the virtual machine to a user. In operation 812, a proxy is placed on the virtual machine. The proxy is capable of updating the configuration information of the virtual machine, such as a username, a password, service account information, a cryptographic key, a digital certificate, a domain name, time zone information, language information, or user personalization information. In operation 813, the provisioning of the virtual machine is suspended.

In operation 814, the operator of a virtualized environment receives a request for the virtual machine from a user. In addition to submitting the request for the virtual machine, the user may also submit configuration information, such as a username and password to be used with the virtual machine, as shown in operation 815. Once the configuration information is received, it is provided to the proxy installed on the virtual machine in operation 816. In operation 817, the proxy then updates the configuration of the virtual machine with the user-specified configuration information and deactivates itself in operation 818.

Figure 9:
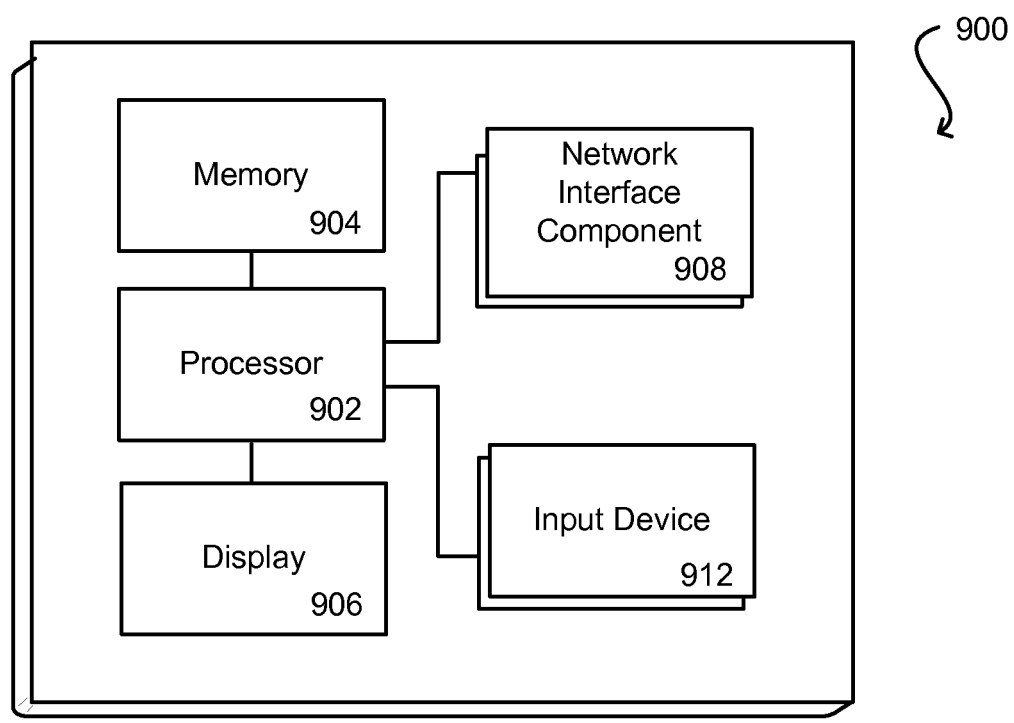
FIG. 9 illustrates a logical arrangement of a set of general components of an example computing device that can be utilized in accordance with various embodiments.

FIG. 9 illustrates a logical arrangement of a set of general components of an example computing device 900. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. As discussed, the device in many embodiments will include at least one input element 908 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 900 of FIG. 9 can include one or more network interface elements 908 for communicating over various networks, such as a Wi-Fi, Bluetooth, RF, wired, or wireless communication systems. The device in many embodiments can communicate with a network, such as the Internet, and may be able to communicate with other such devices.

Figure 10:
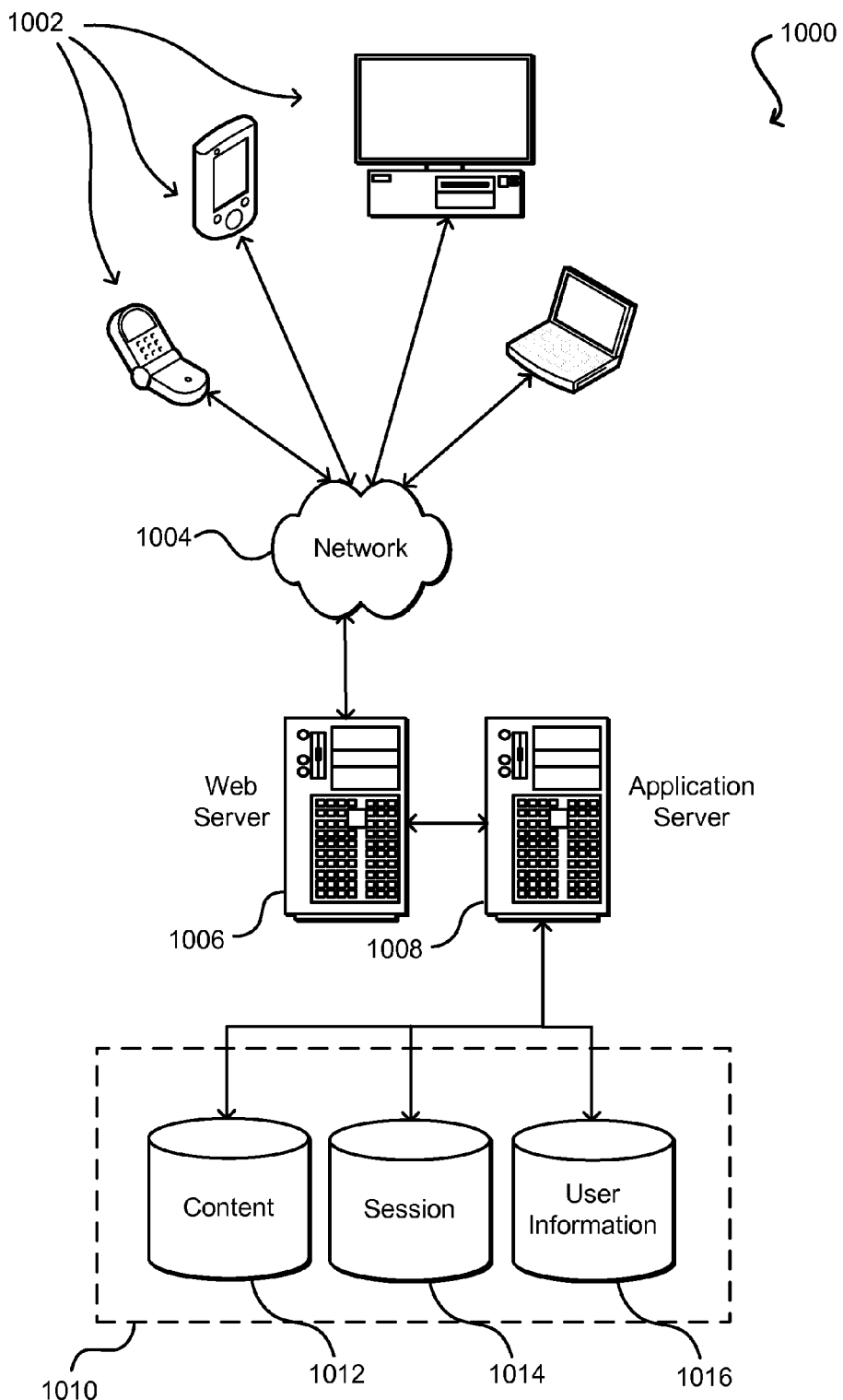
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 716, which can be used to serve content for the production side. The data store also is shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, FTP, UPnP, NFS and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer readable storage medium storing one or more sequences of instructions, which when executed by one or more processors to cause a computing system to:
  initiate provisioning of a virtual machine on a host computing device, the virtual machine including an operating system and a proxy operable to modify a configuration of the operating system on the virtual machine;
  suspend provisioning of the virtual machine and register the virtual machine with a pool of pre-staged virtual machines;
  receive a request for the virtual machine from a user and receive user-specified configuration information to be used in configuring the virtual machine, the user-specified configuration information including one or more credentials of a user;
  selecting the virtual machine from the pool of pre-staged virtual machines in response to the request;
  transfer the user-specified configuration information to the proxy on the virtual machine, the proxy configured to update the configuration of the operating system on the virtual machine with the user-specified configuration information such that the virtual machine is accessible using the one or more credentials of the user as a result of the update;
  deactivate the proxy on the virtual machine; and
  enable the user to access the virtual machine.

2. The non-transitory computer readable storage medium of claim 1, wherein user-specified configuration information is received over a network by a management service by using at least one of: an application programming interface (API), a graphical user interface (GUI), a command line interface, or an application operating a mobile client device.

3. The non-transitory computer readable storage medium of claim 2, wherein transferring the user-configuration information further comprises:
  transmitting the user-specified configuration information from the management service to an agent operating on the host computing device;
  copying the user-specified information from the agent on the host computing device to the proxy in the virtual machine; and
  deleting the user-specified information from the agent in the host computing device.

4. The non-transitory computer readable storage medium of claim 1, wherein the proxy is operating on the virtual machine using administrative credentials until the proxy receives the one or more credentials of the user.

5. A computer implemented method, comprising:
  under the control of one or more computer systems configured with executable instructions,
    receiving a request to provision a virtual machine for a user, the virtual machine operating on a host computing device, the virtual machine including a proxy operable to modify a configuration of the virtual machine;
    receiving configuration information to be used with the virtual machine;
    transferring the configuration information to the proxy on the virtual machine, the proxy configured to update the configuration of the virtual machine with the received configuration information.

6. The computer implemented method of claim 5, further comprising:
  selecting the virtual machine from a pool of pre-staged virtual machines in response to receiving the request, wherein each pre-staged virtual machine in the pool has been installed with an operating system, the operating system having an incomplete configuration;
  updating the configuration of the operating system with received configuration information; and
  enabling the user to access the selected virtual machine after the configuration of the virtual machine has been updated with the received configuration information.

7. The computer implemented method of claim 5, wherein the configuration information further comprises at least one of:
  a username, a password, service account information, a cryptographic key, a digital certificate, a domain name, time zone information, language information, or user personalization information.

8. The computer implemented method of claim 5, wherein the proxy is operating on the virtual machine using administrative credentials until receiving one or more user credentials, wherein in response to receiving the one or more user credentials, the proxy updates the virtual machine with the one or more user credentials.

9. The computer implemented method of claim 5, further comprising:
  updating a network configuration of an operating system of the virtual machine for a virtual network, the virtual network comprising a plurality of virtual machines provisioned for the user.

10. The computer implemented method of claim 5, wherein the host computing device further comprises:
  a hypervisor; and
  a host domain including an agent operating on the host domain, the agent configured to receive the configuration information from a management service and transfer the received configuration information to the proxy on the virtual machine.

11. The computer implemented method of claim 5, wherein any copies of the configuration information are deleted from the host computing device after updating the configuration of the virtual machine.

12. The computer implemented method of claim 5, further comprising:
  enabling the user to access the virtual machine over a network using at least one application programming interface (API).

13. The computer implemented method of claim 5, wherein the proxy is further configured to deactivate itself after completing the update of the configuration of the virtual machine.

14. A computing system, comprising:
  at least one processor; and
  memory including instructions that, when executed by the at least one processor, cause the computing system to:
    receive a request to provision a virtual machine for a user, the virtual machine operating on a host computing device, the virtual machine including a proxy operable to modify a configuration of the virtual machine;
    receive configuration information to be used with the virtual machine;

transfer the configuration information to the proxy on the virtual machine, the proxy configured to update the configuration of the virtual machine with the received configuration information.

15. The computing system of claim 14, wherein the memory further includes instructions that, when executed by the at least one processor, cause the system to:
   select the virtual machine from a pool of pre-staged virtual machines in response to receiving the request, wherein each pre-staged virtual machine in the pool has been installed with an operating system, the operating system having an incomplete configuration;
   update the configuration of the operating system with received configuration information; and
   enable the user to access the selected virtual machine after the configuration of the virtual machine has been updated with the received configuration information.

16. The computing system of claim 14, wherein the configuration information further comprises at least one of:
   a username, a password, a cryptographic key, a digital certificate, a domain name, time zone information, language information, or user personalization information.

17. The computing system of claim 14, wherein the proxy is operating on the virtual machine using administrative credentials until receiving one or more user credentials, wherein in response to receiving the one or more user credentials, the proxy updates the virtual machine with the one or more user credentials.

18. The computing system of claim 14, the memory further including instructions that, when executed by the at least one processor, cause the computing system to:
   updating a network configuration of an operating system of the virtual machine for a virtual network, the virtual network comprising a plurality of virtual machines provisioned for the user.

19. The computing system of claim 14, wherein the host computing device further comprises:
   a hypervisor; and
   a host domain including an agent operating on the host domain, the agent configured to receive the configuration information from a management service and transfer the received configuration information to the proxy on the virtual machine.

20. The computing system of claim 14, wherein any copies of the configuration information are deleted from the host computing device after updating the configuration of the virtual machine.

\* \* \* \* \*